United States Patent
Lucente-Schultz et al.

(10) Patent No.: US 9,656,889 B2
(45) Date of Patent: May 23, 2017

(54) INHIBITORS FOR ORGANICS SOLUBILIZED IN PRODUCED WATER

(71) Applicant: Ecolab USA Inc., Eagan, MN (US)

(72) Inventors: Rebecca M. Lucente-Schultz, Missouri City, TX (US); Ronald O. Bosch, Houston, TX (US); Manojkumar Bhandari, Stafford, TX (US); Robert Perry, Houston, TX (US)

(73) Assignee: Ecolab USA Inc., St. Paul, MN (US)

( * ) Notice: Subject to any disclaimer, the term of this patent is extended or adjusted under 35 U.S.C. 154(b) by 178 days.

(21) Appl. No.: 14/012,260

(22) Filed: Aug. 28, 2013

(65) Prior Publication Data

US 2014/0217033 A1    Aug. 7, 2014

Related U.S. Application Data

(60) Provisional application No. 61/693,999, filed on Aug. 28, 2012.

(51) Int. Cl.
| | |
|---|---|
| *B01D 17/04* | (2006.01) |
| *C02F 1/68* | (2006.01) |
| *B01D 17/02* | (2006.01) |
| *E21B 21/06* | (2006.01) |
| *C09K 8/28* | (2006.01) |
| *C09K 8/584* | (2006.01) |
| *E21B 43/00* | (2006.01) |

(Continued)

(52) U.S. Cl.
CPC ............. *C02F 1/68* (2013.01); *B01D 17/04* (2013.01); *B01D 17/044* (2013.01); *B01D 17/047* (2013.01); *E21B 43/00* (2013.01); *C02F 1/40* (2013.01); *C02F 2101/34* (2013.01); *C02F 2103/10* (2013.01); *C02F 2305/04* (2013.01)

(58) Field of Classification Search
None
See application file for complete search history.

(56) References Cited

U.S. PATENT DOCUMENTS 3,622,513 A * 11/1971 Miller ................ C09K 8/32
208/6
3,878,111 A * 4/1975 McGlothlin ............ C09K 8/36
507/103

(Continued)

FOREIGN PATENT DOCUMENTS

WO    WO 2009112379 A1 *   9/2009 ............. B01D 17/04

OTHER PUBLICATIONS

Karsa et al. (Design and Selection of Performance Surfactants, 1999, CRC Press, p. 241).*
International Preliminary Report on Patentability issued for PCT/US2013/057028, dated Mar. 3, 2015, 5 pages.

*Primary Examiner* — Clare Perrin
(74) *Attorney, Agent, or Firm* — Senniger Powers LLP

(57) ABSTRACT

A surface active compound is supplied into contact with an oilfield production fluid that comprises a mixture of water and oil including water soluble organics. The surface active compound comprises at least one alkoxylate chain and at least one end group attached to each of the at least one alkoxylate chain. The surface active compound is supplied into the oilfield production fluid at a dosage rate that is effective to self-associate at interfaces between the water and oil and inhibit the water soluble organics in the oil from entering the water when the oilfield production fluid is depressurized.

11 Claims, 5 Drawing Sheets

(51) Int. Cl.

| | | |
|---|---|---|
| C02F 1/00 | (2006.01) | |
| B01D 21/00 | (2006.01) | |
| C02F 1/30 | (2006.01) | |
| C09K 8/02 | (2006.01) | |
| E21B 21/00 | (2006.01) | |
| C09K 8/36 | (2006.01) | |
| C09K 8/32 | (2006.01) | |
| C09K 8/524 | (2006.01) | |
| C09K 8/60 | (2006.01) | |
| C02F 1/40 | (2006.01) | |
| C02F 101/34 | (2006.01) | |
| C02F 103/10 | (2006.01) | |

(56) References Cited

U.S. PATENT DOCUMENTS

| | | | |
|---|---|---|---|
| 5,759,409 A | * | 6/1998 | Knauf et al. .................. 210/708 |
| 6,130,258 A | * | 10/2000 | Bellos .......................... 210/708 |
| 7,381,332 B2 | * | 6/2008 | Pena ........................ C09K 8/32 |
| | | | 175/66 |
| 2004/0089590 A1 | | 5/2004 | Calvert |
| 2004/0171495 A1 | | 9/2004 | Zamora et al. |
| 2008/0167445 A1 | * | 7/2008 | Podella .................... C11D 3/38 |
| | | | 530/350 |
| 2009/0048352 A1 | | 2/2009 | Talingting-Pabalan et al. |
| 2011/0011806 A1 | * | 1/2011 | Ebert et al. .................. 210/708 |
| 2011/0062369 A1 | | 3/2011 | Yeggy et al. |
| 2011/0259583 A1 | | 10/2011 | Bittner et al. |

* cited by examiner

= scaffold molecule.

= any synthetic attachment of alkoxylate chain to scaffold molecule.

☐ = alkoxylate chain.

= polar, protonizeable end group.

INHIBITORS FOR ORGANICS SOLUBILIZED IN PRODUCED WATER

CROSS-REFERENCE TO RELATED APPLICATIONS

This application claims the benefit of priority of U.S. Provisional Patent Application Ser. No. 61/693,999 filed on Aug. 28, 2012, which application is incorporated by reference herein.

BACKGROUND OF THE INVENTION

Field of the Invention

The present invention relates to methods and compositions for reducing the concentration of water soluble organics in water.

Background of the Related Art

Water soluble organics (WSOs) are organic molecules that occur naturally in crude oil. The particular combination and amount of WSO species are unique to the region of origin, and up to 120 WSO species can be present in the same crude oil sample at any given time. WSOs are polar compounds mainly comprised of medium chain carboxylic acids. These are sometimes also referred to as naphthenic acids. As their name implies, WSOs have a tendency to accumulate in the water phase, especially when pH is ≥6.0.

A majority of hydrocarbons are produced from subterranean formations along with significant amounts of water, referred to as produced water. An accumulation of WSOs in the produced water can become problematic, since production of the hydrocarbons cannot continue without a way to compliantly dispose of or reuse the produced water. Even though WSOs are usually present in the produced water at relatively low levels of about 1000 ppm, WSOs contribute to the amount of overall oil and grease. "Oil and grease", or simply "O&G", is a term for organic pollutants in water. Technically, O&G is the set of organic molecules that extract into n-hexane (hexane extractable material, HEM) from water at a pH of 2 or less, and remain as a residue after the n-hexane is boiled away. WSOs are the subset of O&G that, furthermore, adsorb onto silica gel, which may be referred to as "silica gel treated—hexane extractable material" or "SGT-HEM." The amount of WSOs, or SGT-HEM, are measured indirectly as the difference between O&G, or HEM, and the material that does not adsorb onto silica gel.

FIG. 1 is a flow diagram of a method 10 for determining the amount of WSOs in water by filtering out the WSOs in one of two identical water samples. In step 12, two identical water samples are taken, and then one of those samples is filtered through a filter that is active for polar organics alone, such as a silica gel, in step 14. The unfiltered sample is processed according to the steps on the lefthand branch of the flow diagram, and the filtered sample is processed according to the similar steps on the righthand branch of the flow diagram. Accordingly, both the unfiltered and filtered samples are acidized (steps 16A, 16B); combined with an extractant, such as hexane, Vertrel or other approved solvent (steps 18A, 18B); analyze the extract for oil, such as by gravimetric analysis (weight difference) or infrared analysis (steps 20A, 20B); and determine the total oil and grease (Total O&G) in the unfiltered sample (step 22A) and the free oil and grease (Free O&G) in the filtered sample (step 22B). Finally, step 24 determines the amount of water soluble organics (WSO) as equal to the Total O&G less the Free O&G.

FIG. 2 is a flow diagram of an alternative method 30 for determining the amount of WSOs in water by adjusting the pH of one of two identical water samples. In step 32, two identical water samples are taken, and then an acid is added to one of those samples in step 34. The acidized sample is processed according to the steps on the lefthand branch of the flow diagram, and the unacidized sample is processed according to the similar steps on the righthand branch of the flow diagram. Accordingly, both the acidized sample (box 36A) and unacidized sample (box 36B) are combined with an extractant, such as hexane, Vertrel or other approved solvent (steps 38A, 38B); the extract is analyzed for oil, such as by gravimetric analysis (weight difference) or infrared analysis (steps 40A, 40B); and the total oil and grease (Total O&G) in the unfiltered sample (step 42A) and the free oil and grease (Free O&G) in the filtered sample is determined (step 42B). Finally, in step 44, the amount of water soluble organics (WSOs) is determined as the Total O&G minus the Free O&G.

Currently, limits set forth by the EPA (Methods 413.1/ 413.2 and 1664) allow produced water discharged into the Gulf of Mexico to contain a monthly average of no more than 29 mg O&G per liter of produced water. Daily discharge limits for O&G can be as high as 42 mg/L; however, higher discharges must be compensated for with discharges having correspondingly lower O&G concentrations, such that the average for the month is ≤29 mg/L.

Acids being the main constituents of WSOs accounts for the fact that WSO accumulation in water is largely governed by pH. Higher pH causes the acid/base equilibrium to shift towards the presence of water soluble carboxylate salts, while at lower pH, the absence of charge imparts enough lipophilicity to partition the molecules back into the oil phase. There, the acids form dimers via hydrogen bonds, causing them to become even more lipophilic and able to migrate further into the oil away from the water/oil interface. This clears the interface to make room for more protonated acids to enter the oil phase, thus becoming another driving force for the equilibrium. Although mechanical means such as filtration can be used to remove WSOs oftentimes more efficiently, chemical treatment is generally the most cost-effective method for WSO control. With regard to chemical treatment with conventional water clarifiers, WSOs remain even though dispersed oil is removed. This is because WSOs are mostly dissolved, not dispersed, in the system. Consequently, WSO levels are typically unaffected by conventional water clarifier treatment. Cationic water clarifiers typically, at best, remove from 10 to 20 percent (%) of the WSOs that may be associated with microemulsions.

The standard treatment for WSO control is simple acidification via mineral and/or organic acids. These types of acids are considered strong acids with a pKa of 3.2 or less. Disadvantages of acid treatment include handling hazards (health, safety, environmental) and space requirements (due to the large volumes needed). Furthermore, some acids pose corrosion and/or scale risks, and may interfere with the effectiveness of water clarifier treatment to remove dispersed oil. U.S. Pat. No. 5,354,477 involves the use of low molecular weight amines or amine quaternaries in combination with strong acid to remove water soluble organics. The weak, hydrophilic α-hydroxymonocarboxylic acids disclosed in U.S. Pat. No. 6,695,968 are a less severe option (pKa>3.8) that circumvents various disadvantages, but must be administered with anionic polymers for optimal WSO control.

BRIEF SUMMARY OF THE INVENTION

One embodiment of the present invention provides a method comprising supplying at least one surface active compound into contact with an oilfield production fluid that comprises a mixture of water and oil including water soluble organics, wherein the at least one surface active compound comprises at least one alkoxylate chain and at least one end group attached to each of the at least one alkoxylate chain, and wherein the at least one surface active compound is supplied at a dosage rate that is effective to self-associate at interfaces between the water and oil and inhibit the water soluble organics in the oil from entering the water when the oilfield production fluid depressurizes.

DETAILED DESCRIPTION OF THE INVENTION

Figure 1:
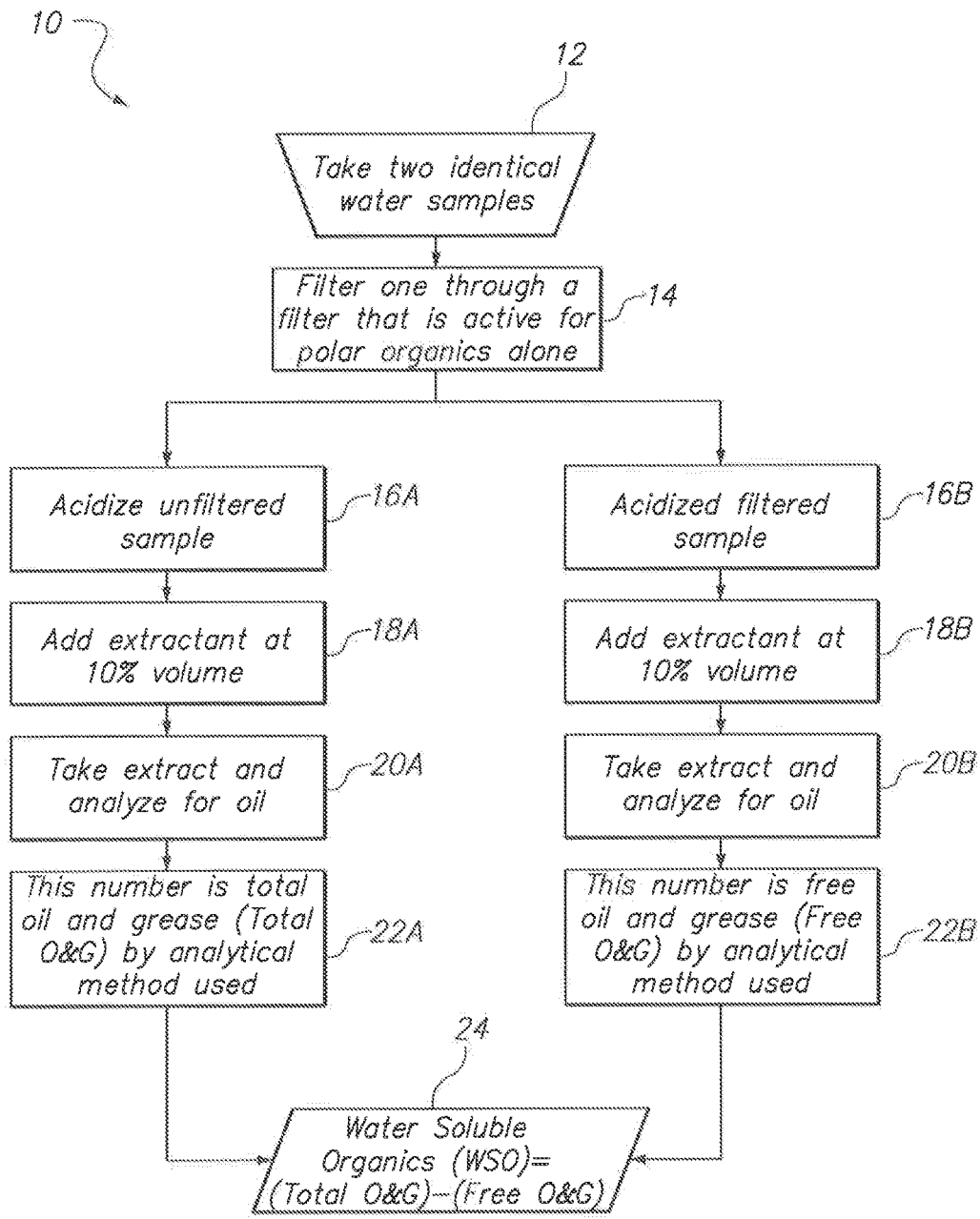
FIG. 1 is a flow diagram for determining the amount of WSOs in water by filtering out the WSOs in one of two identical water samples.

One embodiment of the present invention provides a method comprising supplying at least one surface active compound into contact with an oilfield production fluid that comprises a mixture of water and oil including water soluble organics, wherein the at least one surface active compound comprises at least one alkoxylate chain and at least one end group attached to each of the at least one alkoxylate chain, and wherein the at least one surface active compound is supplied at a dosage rate that is effective to self-associate at interfaces between the water and oil and inhibit the water soluble organics in the oil from entering the water when the oilfield production fluid is depressurized.

The concentration of water soluble organics (WSOs) in a produced water discharge stream is reduced using the surface active compositions of the present invention. Scaffold molecules branched with alkoxylation and capped with polar end groups act to inhibit WSOs in the oil phase from entering the water phase during the degasification process. Embodiments of the surface active compounds may be made in a non-acidic form (pH ~7.0) to eliminate the hazards associated with using acids to treat WSO problems. Furthermore, the surface active compositions of the present invention inhibit WSOs at the oil/water interface such that a lower concentration of the surface active compounds is necessary for the reduction of WSO levels in discharged water. This concentration is lower in comparison to most other chemicals (acids) currently being used for WSO control, which operate on a molecule per molecule (stoichiometric) basis. The interfacial activity provided by the surface active compounds of the present invention allows these surface active compounds to be used at smaller dose rates than other chemicals that work in the bulk phase.

The methods of the present invention relate to the inhibition of WSOs by virtue of interfacial exchange, whereby higher molecular weight molecules of the same interfacial solubility will displace lower molecular weight molecules (in this case WSOs). The methods accomplish this while these WSOs are still largely oil-soluble prior to the depressurization and subsequent pH change of the fluid. Accordingly, the method includes the injection of a surface active compound of the present invention prior to the depressurization of the system when gas is removed from the fluid in front of the high pressure separator. Furthermore, the acidic groups of the surface active compounds tend to prevent the deprotonated WSOs, as a function of pH equilibrium, in the oil phase from moving into the water phase and, at the same time, promote the protonation of deprotonated WSOs in the water phase, thereby enhancing the driving force of the WSOs to reenter the oil phase.

Although the surface active compounds of the present invention contain acidic groups, the surface active compounds, in one embodiment of the invention, are salted in the finished product such that the pH of the surface active compounds is neutral, thus, reducing storage and transportation hazards and corrosivity in application. The salted end groups may also be referred to as "protonizable end groups." Each of the surface active compounds is an inhibitor that works at the oil-water interface and so is effective at smaller doses than traditional chemicals, such as acids that are currently used in stoichiometric quantities to treat WSO problems.

Figure 2:
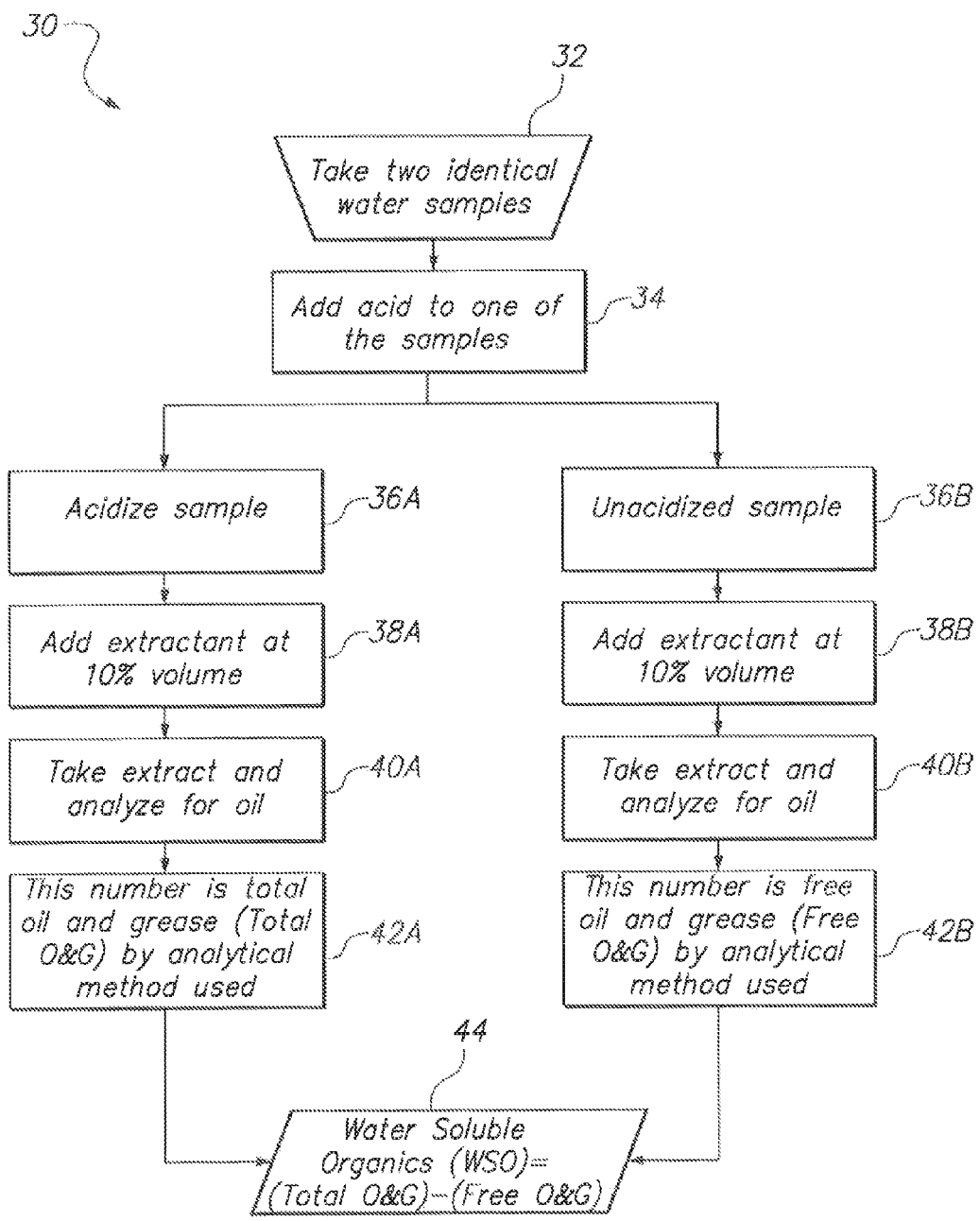
FIG. 2 is a flow diagram for determining the amount of WSO's in water by adjusting the pH of one of two identical water samples.

Methods of the invention may be used to reduce the WSO portion of O&G as defined by the EPA in the context of producing formations (See FIGS. 1 and 2, above). That is, the methods disclosed herein effectively reduce the soluble concentration of O&G that is not affected or reduced by conventional water clarifiers. The methods may be used, for example, in any well that is producing water along with hydrocarbons. The surface active compositions of the invention are preferably applied prior to degasification of the produced fluid. Typically, the compositions would be added upstream of the high pressure separator in offshore oil and gas operations.

Figure 5:
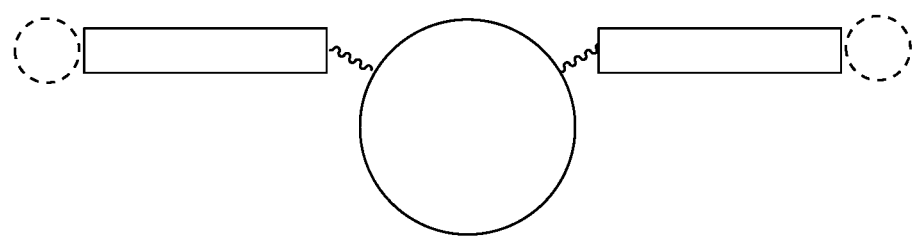
FIG. 5 is a pictorial representation of the surface active compositions.
Figure 5:
Figure 5:
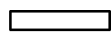
Figure 5:

The surface active compositions of the invention have three components: end groups, alkoxylate branches, and a scaffold molecule. A pictorial representation of the surface active compositions is shown in FIG. 5.

The scaffold molecule can be any molecule able to yield alkoxylate chains. This includes molecules that can be readily alkoxylated, such as alcohols or amines, or molecules that may not be readily alkoxylated as they are, but can be synthetically modified to yield alkoxylate chains after synthetic modification. The preferred scaffold molecule can yield more than one alkoxylate chain to produce a branched type structure, but can also include those scaffold molecules that can only yield one alkoxylate branch. Examples of preferred scaffolds include but are not limited to: triethanol amine, ethylenediamine, diethylenetriamine (DETA), triethylenetriamine, bis(hexamethylene)triamine, and further amine series, pentaerythritol, sorbitol, ditrimethylolopropane, phenolic resins, dendritic resins, polyglycols, poly (vinyl alcohols), any polymer/oligomer that has pendant primary or secondary amine or hydroxyl functionality, etc.

The scaffold molecule preferably has hydroxyl or amino groups that are readily alkoxylated in a one pot process. Another embodiment may involve carboxylic acid groups. The synthetic attachment is preferably via ether or aminoether linkages, but could also occur via ester linkages if carboxylic acid groups are pendant. A synthetic attachment preferably does not involve further synthetic steps other than direct alkoxylation. It should be recognized that hydroxyl groups and secondary amino groups facilitate the synthetic attachment of one alkoxylate chain, whereas a primary amino group facilitates the synthetic attachment of two alkoxylate chains. Accordingly, triethanolamine has three hydroxyl groups that facilitate the attachment of three alkoxylate chains. Ethylenediamine has two primary amine groups that facilitate the attachment of a total of four alkoxylate chains. Diethylenetriamine (DETA) has two primary amine groups and one secondary amine group that facilitate the attachment of a total of five alkoxylate chains.

The alkoxylate branches can be long or short and composed of any combination of alkoxylate units. That is, any molar combination of oxides (ethylene oxide, propylene oxide, and butylene oxide) could be used, although the preferred chemical has branches that are more lipophilic in nature to enhance the surface activity of the chemical. Therefore, the alkoxylate branches of the chemical are tunable with respect to size (by changing the number of moles of oxide per scaffold molecule) and independently tunable with respect to lipo-philicity/hydro-philicity (by changing the ratio and composition of oxide used to synthesize the branches. Furthermore, the oxides can be added in any order for additional solubility tuning. Because the composition of crude oil changes from region to region and even within the same region, the tunability via the alkoxylate chains allows the chemical to be modified for optimum performance in any system of oil and water.

The alkoxylate chain can be any length and composed of any combination of EO, PO, or BO presented in any order. In one example, the alkoxylate chains are lipophilic in nature, so as to increase the surfactant character of the molecule to better draw the molecule to the oil-water interface. Although only two branches are represented in the figure, at least one alkoxylate branch must be present, but the preferred number of branches is from about 2 to 10.

The end groups serve as the polar heads of the molecule to draw the molecule towards the oil/water interface. The end group can be any organic acid group such as but not limited to: phosphates, sulfates, phosphonates, sulfonates, sulfosuccinates, carboxylates, etc. The location of the end groups is at the ends of the alkoxylate branches that branch from the core, scaffold structure. The end groups are acidic when protonated and behave like acids, but the end groups may also be neutralized such that the acidic groups are mainly deprotonated to yield a bulk material (a protonizable "salt") that is of neutral pH (for example, 6.2>pH<7.6).

The end group moiety may be protonated or deprotonated at neutral pH according to the pKa of the particular structure chosen. The end group moiety needs at least one protonizeable (salt) or protonated (acid) site, but preferably is diprotic or higher. Furthermore, there may be more than one salt or acid functionality in a certain end group moiety on an alkoxylate chain. For example, a sulfosuccinate end group moiety yields both a carboxylate functionality and a sulfonate functionality on the same end group of an alkoxylate chain. However, there is preferably at least one end group per alkoxylate chain.

Although the present invention is not limited to any particular mechanism of action by which the concentration of WSOs in water is affected, it is believed that the mechanism of action for WSO control by the compositions covered in this invention includes both interfacial crowding via the surfactant portion of the molecules, and possible interfacial proton transfer occurring between the end groups and the WSOs in the mixture of oil and water.

Figure 3:
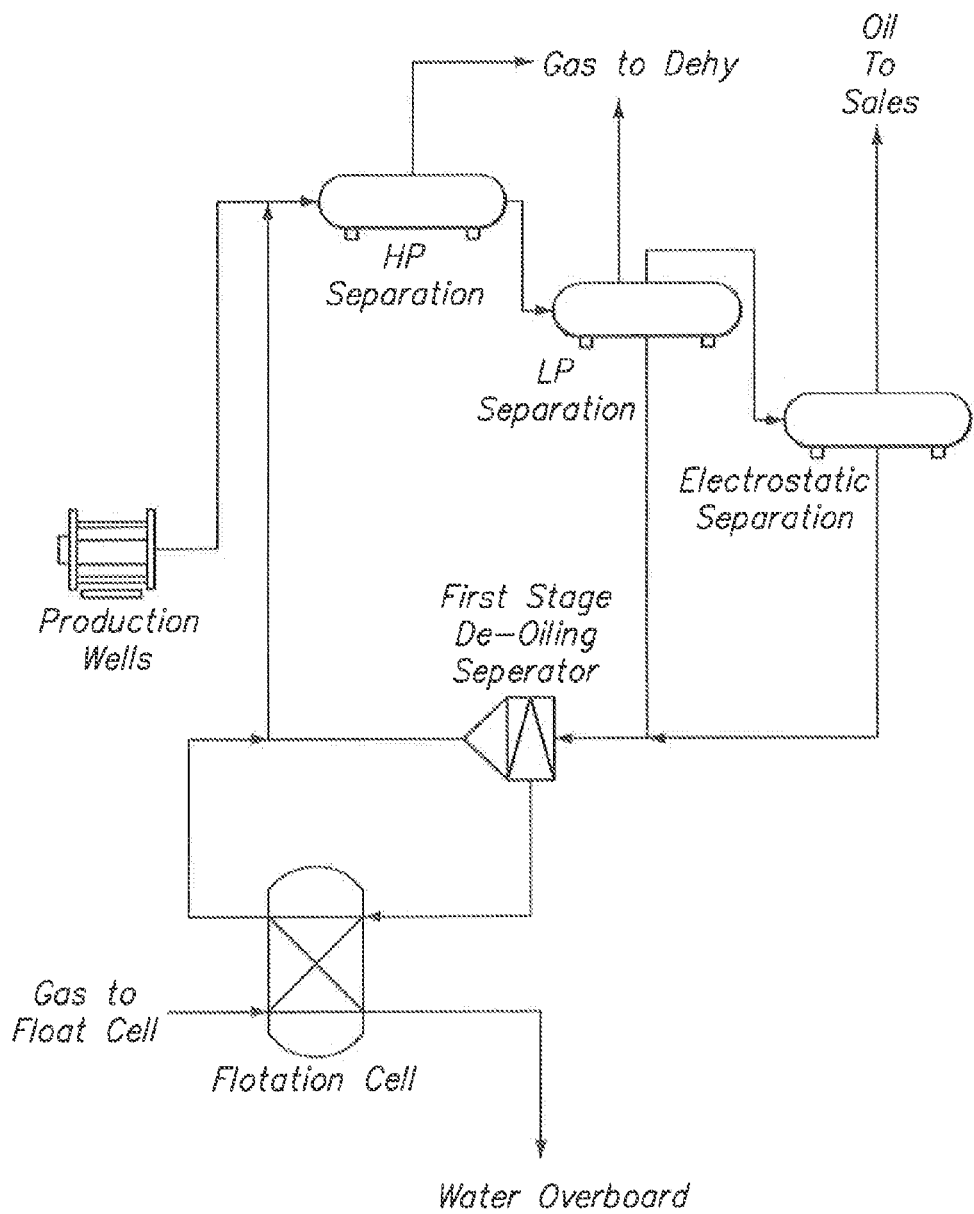
FIG. 3 is a diagram of a typical offshore process for separating produced water and hydrocarbons from a production well.

FIG. 3 is a diagram of a typical offshore process for separating produced water and hydrocarbons from a production well. Oil production consists of taking oil, water, and gas from a formation at high pressure, producing them through a well and separating the oil, gas, and water. The separation process necessarily occurs at a lower pressure than the formation pressure. As a function of this separation process, the gases, which are largely composed of methane and carbon dioxide, are removed, and then the oil and water are separated. Most production platforms accomplish this by the use of a high pressure, two-phase separator as the primary separation vessel. This vessel separates the gas and the liquid. The liquids, consisting of both oil and water, are then piped to an intermediate separator, which can be called the LP (low pressure) separator, the IP (intermediate pressure) separator or FWKO (free water knock-out). This vessel separates the majority of the water and may also separate out more gas. The remaining oil and water are typically treated using an electrostatic coallescer such that the oil is dehydrated to sales specification. This separation is a polishing step. The water from both the LP separator and polishing separator are further treated to remove free oil and then discharged overboard.

As discussed above, water soluble organics partition to the water phase as a function of the deprotonation associated with the change of alkalinity occurring due to the removal of $CO_2$ in the first stage, high pressure separator. The methods of the present invention introduce surface active polymer compositions that inhibit water soluble organics from partitioning to the water phase and promote those water soluble organics in the water phase to transfer to the oil phase. Thus, the surface active compositions are preferably introduced prior to the initial separation of gas from the fluid. In one embodiment, the composition is supplied to the high pressure separator.

EXAMPLES

The following examples are provided for the purpose of disclosing specific implementations of the invention. However, these examples should not be interpreted as limiting the scope of the invention.

Example 1

Synthesis of Alkoxylated DETA Sulfosuccinate

Figure 4:
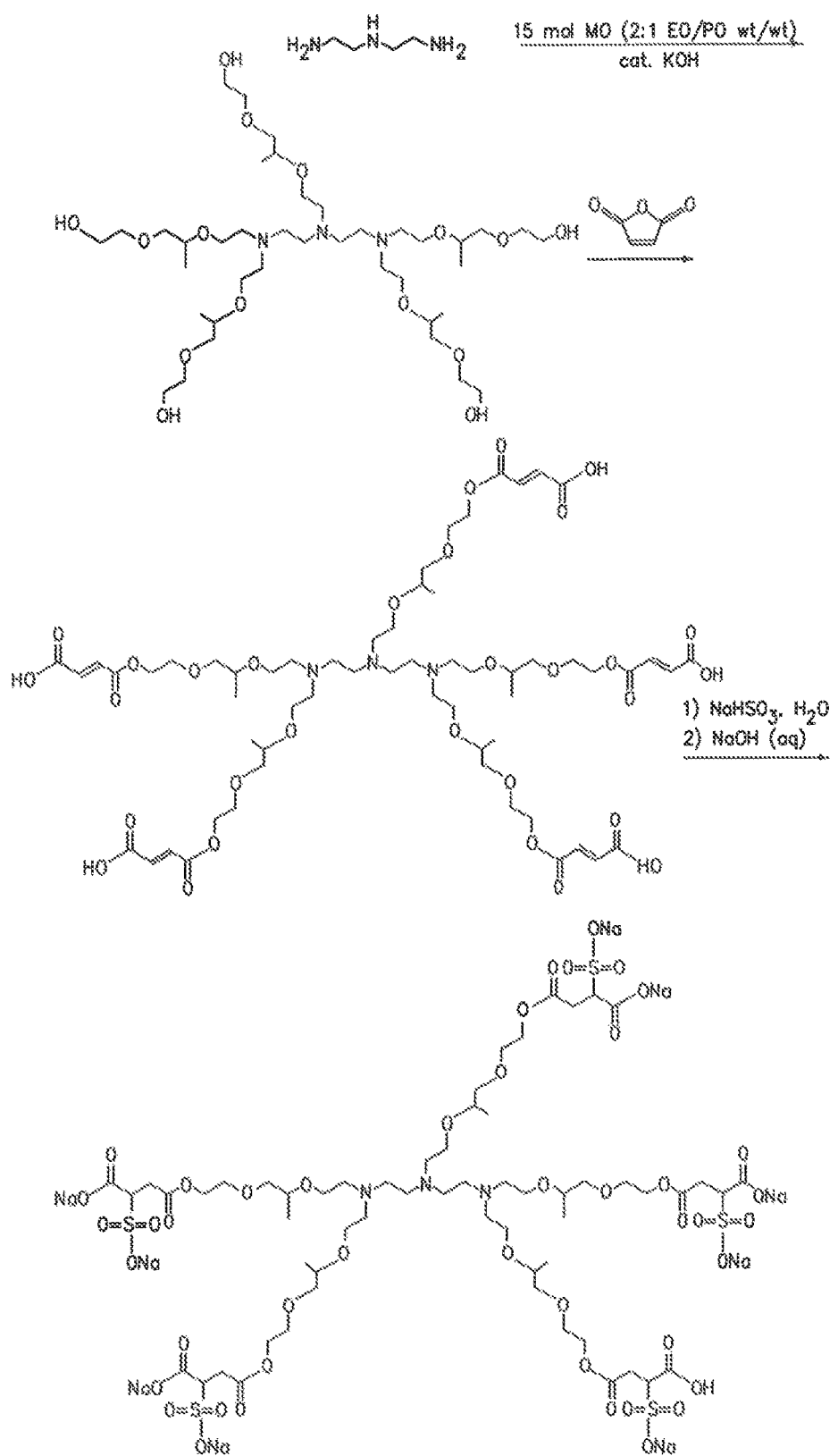
FIG. 4 is a chemical diagram illustrating the steps of preparing an alkoxylated DETA sulfosuccinate that may be used in accordance with one embodiment of the invention.

Alkoxylated DETA sulfosuccinate was prepared for use as a composition for reducing the concentration of WSO in water. The composition was made in four steps: (1) alkoxylation, (2) maleate formation, (3) sulfosuccination, and (4) neutralization. These four steps are also shown in reference to FIG. 4.

Step 1

DETA Alkoxylate

DETA was charged into a high pressure stainless steel autoclave. The reactor was heated to 120° C. with stirring. The first charges of EO and PO were added as mixed oxide (MO) to replace each reactive hydrogen on the nitrogen atoms of DETA with alkoxylate groups (6 alkoxylate groups per molecule of DETA). The content of the reactor was dehydrated down to 0.1% moisture (verifying moisture with Karl Fisher titration). The remaining amounts of EO and PO were charged as MO at 120° C. until the hydroxyl number was 160-170. The reactor contents were then discharged. The ratio of EO:PO was verified via $^1$H NMR.

TABLE 1

Charge weights for DETA alkoxylates.

| Material | Wt % for 2:1 EO/PO | Wt % for 1:2 EO/PO |
|---|---|---|
| DETA | 12.23 | 11.39 |
| EO | 17.58 | 8.10 |
| PO | 11.59 | 21.36 |
| KOH (45%, aq.) | 0.25 | 0.25 |
| EO | 35.17 | 16.20 |
| PO | 23.18 | 42.71 |

Step 2

DETA Alkoxylate Maleate

The DETA alkoxylate was charged to a 1 L, 4-neck, round bottom flask equipped with: an overhead stirrer/shaft with bolt-fastened stir blade, temperature controller/temperature probe/$N_2$ blanket via a needle in the headspace of the reactor, reflux condenser/bubbler, and a glass stopper. The material was heated to 85° C. Once at 85° C., maleic anhydride (MA), crushed to a course powder via mortar and pestle, was added to the reactor via a powder funnel in three portions. Subsequent additions were made once the reaction temperature dropped back down to <90° C. (usually around 20 minutes between additions). After the last MA addition, the reaction was cooked for 30 minutes, and a sample of the product was withdrawn for FT-IR to confirm disappearance of the MA peaks at 1780 and 1860 $cm^{-1}$.

TABLE 2

Charge weights and materials for maleate formation.

| Material | Wt % |
|---|---|
| DETA Alkoxylate | 64.46 |
| Maleic Anhydride | 11.85 |
| Maleic Anhydride | 11.85 |
| Maleic Anhydride | 11.85 |

Steps 3 and 4

Neutralized DETA Alkoxylate Sulfosuccinate

Sulfosuccination and neutralization are performed in the same pot as the maleate reaction. 30 minutes after MA addition and once cooled to below 100° C., drop-wise addition of 40% sodium bisulfite solution to the reactor began via an addition funnel. The total time of addition was ~20 minutes. After sodium bisulfite addition was completed, water was added to dilute the product down to 50% activity. A 50% (aq) sodium hydroxide solution was then added to the reactor portion-wise with real-time monitoring of pH via a pH probe suspended into the reactor. Starting pH was 3.5-4.0 and the pH was adjusted to 6.5-7.5. The product was then discharged from the reactor. Residual sulfite was analyzed via Ion Exchange Chromatography with Suppressed Conductivity (IC).

TABLE 3

Charge weights and materials for sulfosuccination and neutralization.

| Material | Wt % |
|---|---|
| DETA Alkoxyl Maleate | 31.33 |
| $NaHSO_3$ (40%, aq.) | 31.94 |
| Water | 24.94 |
| NaOH (50%, aq.) | 11.79 |

Example 2

Complex Polyol Phosphate Ester

Step 1: Dendritic Polymer Formation
Step 2: Dendritic Polymer Alkoxylation
Step 3: Phosphate Esterification of Alkoxylated Dendritic Polymer
Step 4: Neutralization of Alkoxylated Dendritic Polymer Phosphate Ester Example 3

Nonyl Phenol Ethoxylate Sulfate Ester

Step 1: Nonyl Phenol Resins
Step 2: Alkoxylation of Nonyl Phenol Resin
Step 3: Sulfate Esterification of Alkoxylated Nonyl Phenol Resin.
Step 4: Neutralization of Alkoxylated Nonyl Phenol Resin Sulfate Ester Example 4

Synthesis of Alkoxylated DETA Sulfosuccinate Neutralized with N-Butylamine

Three additional inhibitor compositions were synthesized for use in the field tests of Example 5, below. Each of these three inhibitor compositions, Polymer-1, Polymer-2 and Polymer-3, was synthesized in accordance with the procedures in steps 1-4 of Example 1, except that the DETA alkoxylate sulfosuccinate was neutralized with n-butylamine rather than 50% NaOH.

Step 1

DETA Alkoxylate

Three DETA alkoxylates were prepared using the same procedure as in Step 1 of Example 1, but with different EO:PO ratios and approximate molecular weights as shown in Table 4.

TABLE 4

Details of DETA alkoxylate (EO and PO) adducts

| Polymer | DETA alkoxylate-EO:PO ratio | Approximate molecular weight |
|---|---|---|
| Polymer-1 | 1:3 | 1820 |
| Polymer-2 | 1:2 | 5245 |
| Polymer-3 | 3:1 | 1835 |

Step 2

DETA Alkoxylate Maleate

The DETA alkoxylates of Step 1 of this Example were then subject to the same procedure as in Step 2 of Example 1, but with different charge weights as shown in Table 5.

TABLE 5

Charge weights and materials for maleate formation

| Polymer | DETA alkoxylate Wt % | Maleic Anhydride Wt % | Maleic Anhydride Wt % | Maleic Anhydride Wt % |
|---|---|---|---|---|
| Polymer-1 | 79.30 | 6.90 | 6.90 | 6.90 |
| Polymer-2 | 91.72 | 2.76 | 2.76 | 2.76 |
| Polymer-3 | 79.45 | 6.85 | 6.85 | 6.85 |

Steps 3 and 4

Neutralized DETA Alkoxylate Sulfosuccinate

The DETA alkoxylate maleates of Step 2 of this Example were then subject to the same procedure as in Steps 3 and 4 of Example 1, except that n-butylamine was used for neutralization instead of 50% NaOH.

TABLE 6

Charge weights and materials for sulfosuccination and neutralization

| Polymer | DETA alkoxyl maleate Wt % | NaHSO$_3$ (40%, aq.) Wt % | Water Wt % | n-Butylamine Wt % |
|---|---|---|---|---|
| Polymer-1 | 37.96 | 22.92 | 33.37 | 5.75 |
| Polymer-2 | 44.50 | 10.78 | 42.34 | 2.38 |
| Polymer-3 | 38.20 | 22.90 | 33.62 | 5.28 |

Example 5

Field Tests

Samples of produced water were obtained from two wells located near Baytown, Tex. Previous testing of produced water from these two wells indicated the presence of WSO in the produced water. The presence of WSOs was confirmed by the difference in total oil and grease readings for a neat, untreated sample of produced water and a sample treated with hydrochloric acid. Approximately 0.8-liter samples of produced water were collected at the well head in one-liter glass bottles.

Prior to sample collection, several sample bottles were dosed with 400 microliters of selected inhibitor chemicals (Polymer-1, Polymer-2, and/or Polymer-3, separately) so that the final application concentration was 500 ppm of the selected inhibitor, based on total fluids. In addition, one neat, untreated sample was collected from each well and one sample treated with hydrochloric acid (HCl) to a pH less than 2 was also collected from well #1 for comparison. The samples were then transported to a laboratory for analysis.

The samples were analyzed for total oil and grease content using an InfraCal TOG/TPH Model HART-T2 analyzer and the 10:1 extraction procedure for oil in water. Field samples were allowed to sit overnight after collection to allow for oil and water separation. Each sample was then poured into a plastic 1-liter separation funnel and allowed to sit for an additional three hours or more. Three 100-ml samples of produced water were then drained off the bottom of the separation funnels into three six-ounce medicine bottles. Hexane (10 ml) was then added to each bottle to serve as an extract solvent for the oil and grease in the water. The bottles were shaken (100 times hard) to mix the water and the hexane, and then allowed to sit for at least 30 minutes to allow the hexane solvent to rise to the top of the medicine bottles. A pipette was then used to draw off a couple of milliliters of the extract solvent and placed into a one ounce bottle containing a few grams of sodium sulfate, anhydrous, to absorb any water present in the solvent. A digital microdispenser was then used to draw off a 50 microliter sample of the extract solvent and placed this sample on the IR sample plate of the InfraCal for analysis.

Each sample was analyzed in triplicate and the results averaged. Prior testing using the InfraCal indicated that the measurement error for the method is about plus or minus 10%. Therefore, for testing results to shown statistically meaningful reduction of the WSOs in a sample of produced water, the treated results need to be greater than 20% less than the oil and grease value of the neat, untreated sample.

Table 7, below, summarizes the results of the oil and grease measurements on the samples. The table summarizes the individual triplicate results for each sample and the average value. For the neat sample, the 20% value of the expected measurement error range is given. For results to be statistically significant, the difference between the average of the neat sample results and the average of the treated sample results needs to be larger than the 20% error rate. The average values reported are relative values approximating parts per million (ppm) of either total (treated samples) or free (neat sample) O&G, with the difference representing approximate ppm of WSOs.

TABLE 7

Inhibitors Test for Organics Solubilized in Produced Water

| | Results: Triplicate Values | | | Average Value | 20% Measurement Error Range | Difference[1] |
|---|---|---|---|---|---|---|
| Well #1 | | | | | | |
| Neat | 80 | 78 | 77 | 78 | 16 | |
| HCl | 39 | 32 | 33 | 35 | | 43 |
| Polymer-1 | 37 | 26 | 29 | 31 | | 47 |
| Polymer-3 | 36 | 36 | 40 | 37 | | 41 |
| Well #2 | | | | | | |
| Neat | 29 | 35 | 34 | 33 | 7 | |
| Polymer-1 | 19 | 19 | 22 | 20 | | 13 |
| Polymer-2 | 18 | 20 | 23 | 20 | | 13 |

[1]Difference between the neat sample average value and the subject sample average value.

The results indicate the following:
Inhibitor product Polymer-1 was successful in reducing the WSO concentration in the produced water from both wells tested to a greater than a statistically significant level.
Inhibitor product Polymer-3 was successful in reducing the WSO concentration to greater than a statistically significant level for well #1.
Inhibitor product Polymer-2 was only test in well #2 and was successful in reducing the WSO concentration to a greater than a statistically significant level.

These results demonstrate that the tested chemistries were able to reduce the concentration of WSOs in produced water.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for treating an oilfield production fluid, comprising:
supplying at least one surface active compound into contact with an oilfield production fluid comprising a mixture of water and oil including water-soluble organics, wherein the at least one surface active compound comprises amino groups, each amino group being linked to at least one alkoxylate chain, and at least one sulfosuccinate end group attached to each of the at least one alkoxylate chain, the sulfosuccinate end group having protonizeable carboxylate and sulfonate functionality, and depressurizing the oilfield production fluid, wherein the at least one surface active compound self-associates at interfaces between the water and oil and inhibits the water-soluble organics in the oil from entering the water when the oilfield production fluid is depressurized.

2. The method of claim 1, wherein the oil includes water-soluble naphthenic acids.

3. The method of claim 1, where the alkoxylate chain includes more propylene oxide, butylene oxide or a combination thereof than ethylene oxide so that the at least one surface active compound is lipophilic.

4. The method of claim 1, wherein the at least one surface active compound includes from 2 to 10 alkoxylate chains.

5. The method of claim 1, wherein the at least one surface active compound is added into contact with the mixture of oil and water at a dosage rate between 1 and 5000 ppm.

6. The method of claim 1, further comprising the step of separating the oil and the water after the at least one surface active compound is supplied into contact with the mixture of oil and water.

7. A method for treating an oilfield production fluid, comprising:
supplying at least one surface active compound into contact with an oilfield production fluid comprising a mixture of water and oil including water-soluble organics, wherein the at least one surface active compound is diethylenetriamine alkoxylate sulfosuccinate, ethylenediamine alkoxylate sulfosuccinate, triethylenetriamine alkoxylate sulfosuccinate, or bis(hexamethylene)triamine alkoxylate sulfosuccinate, and depressurizing the oilfield production fluid, wherein the at least one surface active compound self-associates at interfaces between the water and oil and inhibits the water-soluble organics in the oil from entering the water when the oilfield production fluid is depressurized.

8. The method of claim 7, wherein the at least one surface active compound is diethylenetriamine alkoxylate sulfosuccinate.

9. The method of claim 7, wherein the at least one surface active compound is ethylenediamine alkoxylate sulfosuccinate.

10. The method of claim 7, wherein the at least one surface active compound is triethylenetriamine alkoxylate sulfosuccinate.

11. The method of claim 7, wherein the at least one surface active compound is bis(hexamethylene)triamine alkoxylate sulfosuccinate.

* * * * *